US 8,817,347 B2

(12) United States Patent
Weyermann et al.

(10) Patent No.: US 8,817,347 B2
(45) Date of Patent: *Aug. 26, 2014

(54) HOLOGRAPHIC STRUCTURE AND METHOD FOR PRODUCING THE SAME

(71) Applicant: Sancoa International Company, L.P., Lumberton, NJ (US)

(72) Inventors: Ulrich E. Weyermann, Bethany Beach, DE (US); Barron G. McKillip, Mickleton, NJ (US); Theodore Hughes, Southampton, NJ (US)

(73) Assignee: Sancoa International Company, L.P., Lumberton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,981

(22) Filed: Sep. 3, 2013

(65) Prior Publication Data

US 2014/0002874 A1    Jan. 2, 2014

Related U.S. Application Data

(63) Continuation of application No. 11/675,324, filed on Feb. 15, 2007, now Pat. No. 8,526,084.

(60) Provisional application No. 60/774,379, filed on Feb. 17, 2006.

(51) Int. Cl.
*G03H 1/00* (2006.01)
(52) U.S. Cl.
CPC .................................. *G03H 1/0011* (2013.01)
USPC ........................................................... 359/2
(58) Field of Classification Search
None
See application file for complete search history.

(56) References Cited

U.S. PATENT DOCUMENTS

| | | | |
|---|---|---|---|
| 3,251,905 A | 5/1966 | Zelinski | |
| 3,390,207 A | 6/1968 | Moss et al. | |
| 3,598,887 A | 8/1971 | Darcy et al. | |
| 3,639,521 A | 2/1972 | Hsieh | |
| 4,208,356 A | 6/1980 | Fukawa et al. | |
| 4,219,627 A | 8/1980 | Halasa et al. | |
| 4,259,285 A | 3/1981 | Baumgartl et al. | |
| 4,713,273 A | 12/1987 | Freedman | |
| 4,728,377 A | 3/1988 | Gallagher | |
| 4,801,193 A | 1/1989 | Martin | |
| 4,906,315 A | 3/1990 | McGrew | |
| 4,913,858 A | 4/1990 | Miekka et al. | |
| 4,933,120 A | 6/1990 | D'Amato et al. | |
| 4,945,215 A | 7/1990 | Fukushima et al. | |
| 5,003,915 A | 4/1991 | D'Amato et al. | |
| 5,083,850 A | 1/1992 | Mallik et al. | |
| 5,087,510 A | 2/1992 | Tokas et al. | |

(Continued)

OTHER PUBLICATIONS

Merriam-Webster's Collegiate Dictionary, Eleventh Edition, 2004 by Merriam-Webster Incorporated, p. 16, definition of "adjacent".

*Primary Examiner* — Derek S Chapel
(74) *Attorney, Agent, or Firm* — McCarter & English, LLP

(57) ABSTRACT

A preprinted holographic label or printed material for use in labeling squeezable tubes or containers as well as compact discs, computer software, cosmetics, and the like is provided. The holographic structure provides for selectively reverse-printing a reflective coating directly onto a micro-embossed holographic film or coating which is affixed to a clear thin-film and contains the micro-embossed structure. Non-reflective coatings and support structures are also provided for protecting both the graphics and embossed holographic image from contamination.

14 Claims, 3 Drawing Sheets

(56) References Cited

U.S. PATENT DOCUMENTS

| | | |
|---|---|---|
| 5,116,548 A | 5/1992 | Mallik et al. |
| 5,164,227 A | 11/1992 | Miekka et al. |
| 5,229,882 A | 7/1993 | Rowland |
| 5,310,222 A * | 5/1994 | Chatwin et al. ............ 283/86 |
| 5,464,710 A | 11/1995 | Yang |
| 5,503,896 A | 4/1996 | Veith et al. |
| 5,643,678 A | 7/1997 | Boswell |
| 5,657,162 A * | 8/1997 | Nilsen et al. ............ 359/530 |
| 5,948,199 A | 9/1999 | McGrew |
| 6,171,734 B1 | 1/2001 | Warnet et al. |
| 6,737,154 B2 | 5/2004 | Jonza et al. |
| 6,821,592 B2 * | 11/2004 | Rodick ............ 428/40.1 |
| 6,882,452 B2 | 4/2005 | Decker et al. |
| 6,987,590 B2 | 1/2006 | Phillips et al. |
| 8,526,084 B2 * | 9/2013 | Weyermann et al. ............ 359/2 |
| 2002/0191234 A1 | 12/2002 | Ishimoto et al. |

* cited by examiner

HOLOGRAPHIC STRUCTURE AND METHOD FOR PRODUCING THE SAME

CROSS-REFERENCE TO RELATED APPLICATIONS

This application is a continuation application of, and claims the benefit of priority to, U.S. patent application Ser. No. 11/675,324 filed Feb. 15, 2007, which claims the benefit of U.S. Provisional Application No. 60/774,379 filed Feb. 17, 2006, the entire disclosures of which are expressly incorporated herein by reference.

INTRODUCTION

Holograms and other types of defraction gratings are commonly attached to documents or other articles. Holograms have been used as security means in documents as well as credit card authentication. Holograms have also been attached to printed documents and other articles for decorative and aesthetic reasons, as well. For consumer goods, hologram containing labels provide an eye-catching display.

There are a variety of methods for creating a holographic image on a label. For example, one method employs transfer technology such as hot stamping or cold foil transfer. This method requires special tooling and the use of a pre-manufactured, disposable, transferable holographic material. In another method, metal is selectively removed from a vacuum metallized holographic material. This method requires the modification to the printing press and requires the use of a caustic solution and bath. In yet another method, a holographic image on a label is created by transferring the embossed image from a film to a varnish applied to the surface of the label. This method requires modification to a UV curing system on the press, addition of a roll unwind and rewind and the use of a disposable embossed film. In addition, this process requires that the holographic image be on the upper surface of the label. This method of manufacture creates an image that is less reflective, not as crisp looking and is subject to contamination causing the image to disappear over time. U.S. Pat. Nos. 4,259,285; 5,503,792; 5,164,227 and 5,503,896 also describe different methods for micro-embossing a variety of materials.

For some applications, the micro-embossed layer has affixed thereto a reflective metallic film so that a vivid, intense image is readily visible. Examples of reflective holographic articles are described in U.S. Pat. Nos. 4,945,215 and 5,087,510.

U.S. Pat. No. 6,821,592 discloses a facestock comprising a polymeric film adhered to a holographic layer on a surface of the facestock, wherein the film is conformable for use on squeezable containers.

U.S. Pat. No. 6,737,154 teaches a multilayer polymer film having an optical stack including a plurality of alternating polymer layers with skin layers having mechanical, optical, or chemical properties differing from those of the layers in the optical stack, wherein the multilayer polymeric film has one or more holograms that provide attractive and useful optical effects.

U.S. Pat. No. 6,882,452 discloses a method of making a holographic device by applying a patterned coating on a predetermined portion of a substrate surface containing a holographic image and depositing a high refractive index material to the substrate surface containing the patterned coating, wherein the patterned coating prevents the high refractive index coating from attaching where the patterned coating is applied and attaching the transparent substrate to a base.

U.S. Pat. Nos. 5,657,162; 4,801,193; and 5,229,882 teach retroreflective sheeting or articles formed using retroreflective and non-retroflective surfaces.

SUMMARY OF THE INVENTION

The present invention is a holographic structure and method for producing the same. The holographic structure of the invention is a micro-embossed holographic film layer with a reverse-printed reflective coating on at least a portion of the lower surface of the micro-embossed holographic film layer; and a base material layer or liner material layer adhered to lower surface of the micro-embossed holographic film layer by a laminating adhesive layer or pressure-sensitive adhesive layer, respectively. In certain embodiments, the holographic structure contains a non-reflective coating on at least a portion of the lower surface of the holographic film; a liner material adhered to the base material layer by a pressure-sensitive adhesive layer; and/or a clear film layer affixed to the upper surface of the micro-embossed holographic film layer.

The method of producing the holographic structure of the present invention is carried out by reverse-printing a reflective coating onto at least a portion of the lower surface of a micro-embossed holographic film layer and applying either a laminating adhesive and base material, or pressure-sensitive adhesive layer and liner, to the lower surface of a micro-embossed holographic film. In certain embodiments, the method of the present invention further includes the steps of applying a non-reflective ink to at least a portion of the lower surface of the micro-embossed holographic film; applying a pressure-sensitive adhesive to the base material and adhering the base material to a liner; and/or applying a transparent film to the upper surface of the micro-embossed holographic film.

DETAILED DESCRIPTION OF THE INVENTION

Figure 1A:
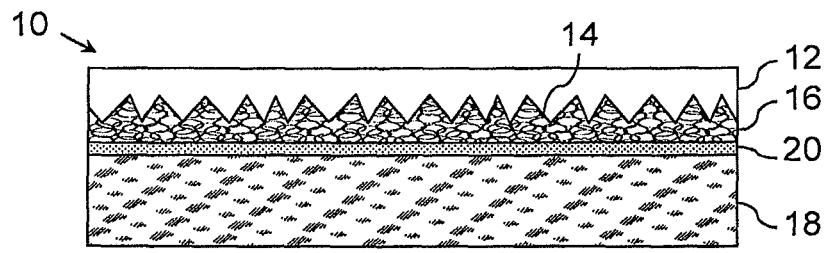
FIG. 1A is a cross-sectional view of a holographic structure containing a micro-embossed holographic film layer 12 with a holographic image 14, reflective coating 16 covering the entire lower surface of micro-embossed holographic film layer 12, and base material layer 18 affixed with laminating adhesive layer 20.

The present invention is a preprinted holographic label or printed material, collectively referred to herein as a holographic structure, for use in labeling squeezable tubes or containers as well as compact discs, computer software, cosmetics, sporting goods and the like. The holographic structure of the present invention improves upon existing holographic materials by selectively printing a reflective coating directly onto a micro-embossed holographic film or to a coating which is affixed to a clear thin-film and contains the micro-embossed structure, thus eliminating both the requirement of special tooling and the disposable film. In addition, the embossed side of the holographic film is adhesively bonded to a second surface thus protecting both the graphics and embossed holographic image from contamination.

Referring to FIG. 1A-1D, holographic structure 10 contains as an upper layer composed of a micro-embossed holographic film layer 12 having a holographic image 14 and a reflective coating 16 reverse-printed on at least a portion of the lower surface of the micro-embossed holographic film layer 12 and a base material layer 18 adhered to the lower surface of the micro-embossed holographic film layer 12 by a laminating adhesive layer 20.

For the purposes of the present invention, the term "upper" is used to describe the layer which would be on the outer surface of a article or product (e.g., tube or container) when the holographic structure is applied as a label. As such, the term "lower" refers to the surface which would be in contact or adjacent to the article or product.

The holographic image 14 of the micro-embossed holographic film layer 12 can be embossed on all (FIGS. 1A and 1B) or a portion (FIGS. 1C and 1D) of the lower surface of holographic film layer 12. For example, holographic image 14 can be a single image (e.g., a product name) or a geometric pattern over the entire lower surface of the holographic film layer. A geometric pattern is generally composed of a plurality of polygonal shaped areas. Examples of polygonal shapes include diamonds, squares, triangles, pentagons, hexagons, stars, circles, and the like. A combination of different shapes can be used to form a pattern. The shapes can be spaced from one another at any distance or can be connected. Spacing between adjacent areas can vary within the pattern or be constant throughout the pattern. It is understood that the tips or edges of adjacent polygons can touch and still be considered individual polygons.

The micro-embossed holographic film layer 12 of the present invention can be colored, clear, or semi-transparent and produced using any well-established method in the art. For example, micro-embossed holographic image can be formed by imprinting or cutting microscopic grooves into a layer of polymeric film.

In a particular embodiment, holographic image 14 is formed using a liquid casting resin. For example, the resin can be a radiation curable resin that is coated onto the polymeric film. In accordance with this embodiment, micro-embossed holographic film layer 12 is a coating affixed to the lower surface of clear film layer 26 (FIG. 2) with laminating adhesive 40, wherein holographic image 14 is imparted into all or a portion of the coating using a hologram master or other means known to those in the art.

Clear film layer 26 can be composed of any thin-film plastic including but not limited to polyethylene film, polypropylene film, polyfluoroethylene film, polyvinylidene fluoride film, polyvinyl chloride film, polyvinylidene chloride film, ethylene-vinyl alcohol film, polyvinyl alcohol film, polymethyl methacrylate film, polyether sulfone film, polyamide film, tetrafluoroethylene-perfluoroalkylvinyl ether copolymer film, polyester film such as polyethylene terephthalate film, polyimide film, or the like.

Radiation curable resins as coatings for generating the micro-embossed holographic film layer 12 include, e.g., Cellofilms such as Cellofilm C-200 and RADCURE® resins, such as RADCURE® #801. The radiation curable resins are generally used as an oligomer. The oligomers are available commercially from a variety of sources. Urethane acrylate oligomers are available from Morton Thiokol as UVITHANE® 782 and UVITHANE® 783, and from Polymer Systems Corp. (Orlando, Fla.) as PURELAST®. EBECRYL® 270 is an acrylated aliphatic urethane oligomer available from UCB RADCURE® (Atlanta, Ga.). Epoxy acrylate oligomers are available, for example, from UCB RADCURE® (Atlanta, Ga.) as NOVACURE® 3600 and from Shell Chemical Company as EPOCRYL® 25A60. Although EPOCRYL® 25A60 contains some volatile solvent, the product can be mixed with an acrylate monomer such as, for example, 1,6-hexanediol diacrylate, and the solvent can subsequently be removed. An example of a commercially available acrylic acrylate oligomer is NOVACURE® 6700 from UCB RADCURE®. An example of a commercially available polyamine acrylate oligomer is NOVACURE® 7100 from UCB RADCURE®. This acrylate functional oligomeric amine is a liquid having a viscosity in the range of 500 to 1500 CPS at 25° C. and a theoretical molecular weight of 800, wherein the oligomer contains less than 10% of hexanediol diacrylate.

The process of imparting the image to the holographic film layer and materials used therein, including materials used as the casting resin, are described in U.S. Pat. Nos. 4,728,377; 4,913,858; 4,933,120; 5,003,915; 5,083,850; 5,116,548; 4,906,315; 5,948,199; 5,164,227; and 5,643,678.

Figure 1B:
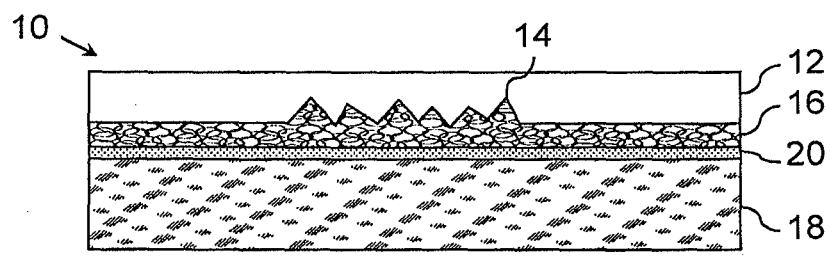
FIG. 1B is a cross-sectional view of a holographic structure containing a micro-embossed holographic film layer 12 with one holographic image 14, reflective coating 16 covering the entire lower surface of micro-embossed holographic film layer 12, and base material layer 18 affixed with laminating adhesive layer 20.

To generate the holographic effect, a reflective coating 16 is reverse-printed onto at least a portion of the image surface or lower surface of the micro-embossed holographic film layer 12. As used throughout the present disclosure, a portion is intended to mean 100% or less, embracing coverage of 0.1% to 99% of a surface, 1% to 80% of a surface, 10% to 70% of a surface, or 50% of a surface, for example. In this regard, reflective coating 16 can be directly printed onto 100% of the lower surface of the micro-embossed holographic film layer 12 (FIGS. 1A and 1B). Alternatively, reflective coating 16 can be directly and selectively printed onto a portion of micro-embossed holographic film layer 12 (FIGS. 1C and 1D), e.g., to cover only the area of the holographic image 14 (see FIG. 1D). In one embodiment, reflective coating 16 is a metallic ink (e.g., Mirasheen™ inks). In another embodiment, reflective coating 16 is a high reflective index coating (e.g., aluminum coating). Reverse-printing of reflective coating 16 to the lower surface of micro-embossed holographic film layer 12 can be carried out using conventional printing techniques including, but not limited to, offset, letter press, gravure, silk screen, flexographic, digital or combinations thereof. In particular embodiments, reverse-printing does not include vacuum deposition.

Using laminating adhesive 20, micro-embossed holographic film layer 12 is affixed or adhered to base material layer 18 composed of clear or opaque plastic or polymeric film, board or paper. Suitable plastics or polymeric films can be derived from polymers that include polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof.

Any well-known laminating adhesive can be used to in laminating adhesive layer 20,40 to respectively adhere base material layer 18 or clear film layer 26 to micro-embossed holographic film layer 12. For example, solvent-type adhesives, emulsion-type adhesives or hot-melt type adhesives are suitable. Exemplary adhesives include, but are not limited to, rubbery adhesive agents, vinyl acetate adhesive agents, ethylene-vinyl acetate adhesive agents, polyvinyl alcohol adhesive agents, polyvinyl acetal adhesive agents, vinyl chloride adhesive agents, acrylic adhesive agents, polyamide adhesive agents, polyethylene adhesive agents, cellulose adhesive agents, polysulfide adhesive agents and hot-melt type high-polymer-containing adhesives.

The laminating adhesive can be applied in a uniform layer or in a geometric pattern such as those disclosed herein for holographic image 14. It is contemplated that the laminating adhesive and holographic image can have corresponding or complementing geometric patterns to enhance the visual effect created by the holographic structure.

The thickness of the resulting holographic structure 10 will range from about 0.5 mils (12.5 microns) to about 10 mils (250 microns) depending upon the anticipated utility of the holographic structure. More often, however, the holographic structure of the present invention will have a thickness of less than 6 mils (150 microns). Holographic structure thicknesses of from about 1 to about 6 mils (25 to 150 microns), more often from about 1 to about 4 mils (25 to 100 microns) and most often from about 1.5 to about 2.5 mils (37.5 to 62.5 microns) are particularly useful for preparing labels to be applied to rigid and flexible substrates. Advantageously, the holographic structure of the invention can be formed into very thin films (i.e., 0.5 to 2.5 mils, or 12.5 to 62.5 microns) for use in forming tube or container labels.

In embodiments depicted in FIGS. 2A-2D, holographic structure 10 alternatively contains a liner or carrier material 28 adhered to holographic film layer 12 by a pressure-sensitive adhesive layer 30. In the embodiment depicted in FIG. 3, holographic structure 10 contains a base material layer 18 in combination with a liner or carrier material 28, wherein the liner is adhered to base material layer 18 by a pressure-sensitive adhesive layer 30. The liner or carrier material can be any suitable pressure sensitive label stock, multilayer liner made for example as disclosed in U.S. Pat. No. 4,713,273, or can be a conventional liner or carrier composed of a single paper or film layer supplied in roll form.

Suitable pressure-sensitive adhesives for use in accordance with the present method include, but are not limited to rubber-based elastomer materials such as linear, branched, grafted, or radial block copolymers composed of a hard thermoplastic phase or block that is non-rubbery and a soft block that is rubbery or elastomeric. The non-rubbery segments or hard blocks can be composed of polymers of mono- and polycyclic aromatic hydrocarbons, and more particularly vinyl-substituted aromatic hydrocarbons, whereas the rubbery blocks or segments are polymer blocks of homopolymers or copolymers of aliphatic conjugated dienes. Rubbery materials such as polyisoprene, polybutadiene, and styrene butadiene rubbers can be used to form the rubbery block or segment. Particularly useful rubbery segments include polydienes and saturated olefin rubbers of ethylene/butylene or ethylene/propylene copolymers. The latter rubbers can be obtained from the corresponding unsaturated polyalkylene moieties such as polybutadiene and polyisoprene by hydrogenation thereof. Block copolymers can be prepared by any of the well-known block polymerization or copolymerization procedures known in the art. See, for example, U.S. Pat. Nos. 3,251,905; 3,390,207; 3,598,887; and 4,219,627; 3,251,905; 3,639,521; and 4,208,356.

The liner or carrier can optionally also contain a release coating (e.g., a silicone), so that the liner or carrier can be removed to expose an adhesive, and the adhesive remains permanently joined to the holographic structure.

Figure 1C:
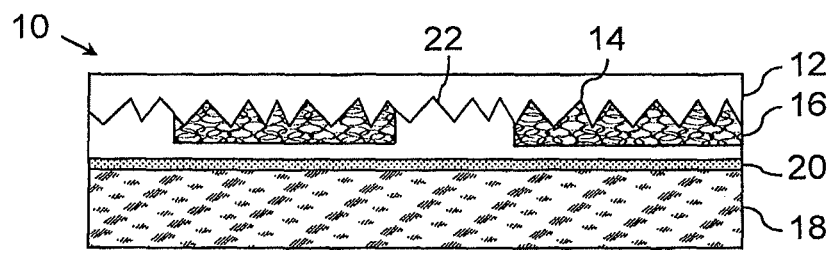
FIG. 1C is a cross-sectional view of a holographic structure containing a micro-embossed holographic film layer 12 with a holographic image 14 covering all of the lower surface of micro-embossed holographic film layer 12, reflective coating 16 and non-reflective coating 22 each covering a portion of the lower surface of micro-embossed holographic film layer 12, and base material layer 18 affixed with laminating adhesive layer 20.
Figure 1D:
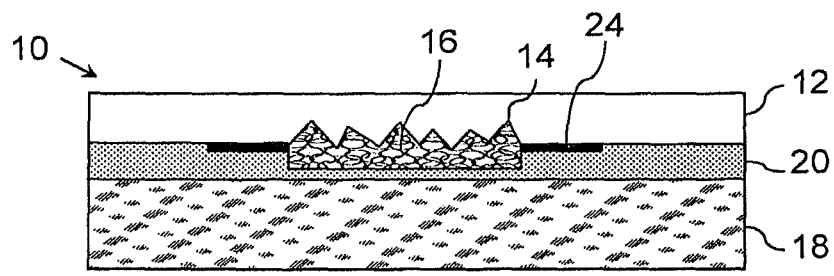
FIG. 1D is a cross-sectional view of holographic structure containing a micro-embossed holographic film layer 12 with one holographic image 14, reflective coating covering a portion of the lower surface of micro-embossed holographic film layer 12, and non-reflective coating 24 dampening reflection from reflective coating 16, and base material layer 18 affixed with laminating adhesive layer 20.
Figure 2A:
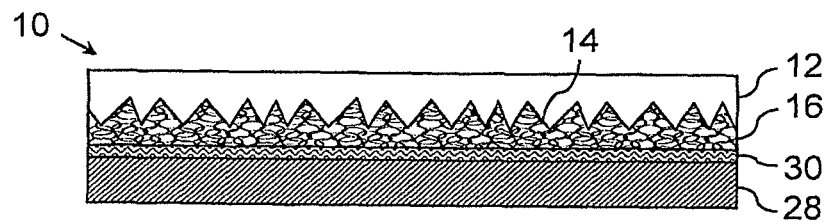
FIG. 2A is a cross-sectional view of a holographic structure containing a micro-embossed holographic film layer 12 with a holographic image 14, reflective coating 16 covering the entire lower surface of micro-embossed holographic film layer 12, and liner layer 28 affixed with pressure-sensitive adhesive layer 30.
Figure 2B:
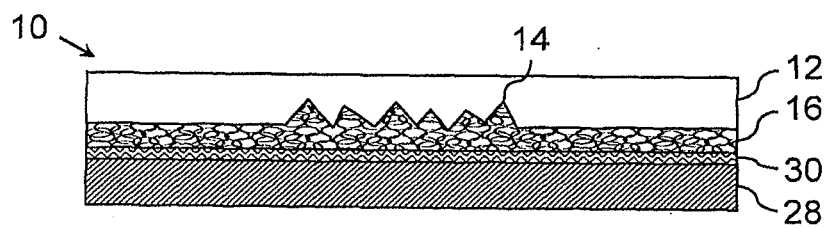
FIG. 2B is a cross-sectional view of a holographic structure containing a micro-embossed holographic film layer 12 with one holographic image 14, reflective coating 16 covering the entire lower surface of micro-embossed holographic film layer 12, and liner layer 28 affixed with pressure-sensitive adhesive layer 30.
Figure 2C:
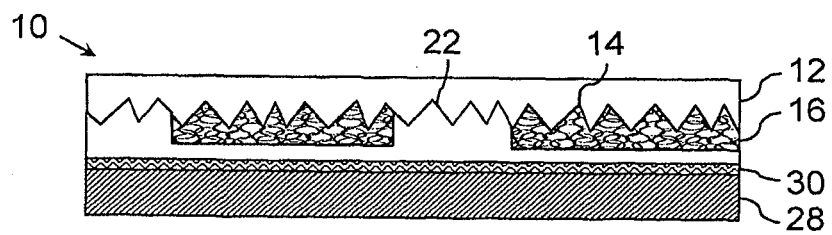
FIG. 2C is a cross-sectional view of a holographic structure containing a micro-embossed holographic film layer 12 with a holographic image 14 covering all of the lower surface of micro-embossed holographic film layer 12, reflective coating 16 and non-reflective coating 22 each covering a portion of the lower surface of micro-embossed holographic film layer 12, and liner layer 28 affixed with pressure-sensitive adhesive layer 30.
Figure 2D:
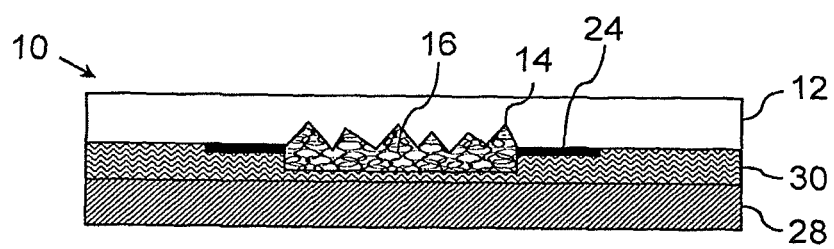
FIG. 2D is a cross-sectional view of holographic structure containing a micro-embossed holographic film layer 12 with one holographic image 14, reflective coating covering a portion of the lower surface of micro-embossed holographic film layer 12, non-reflective coating dampening reflection from reflective coating 16, and liner layer 28 affixed with pressure-sensitive adhesive layer 30.
Figure 3:
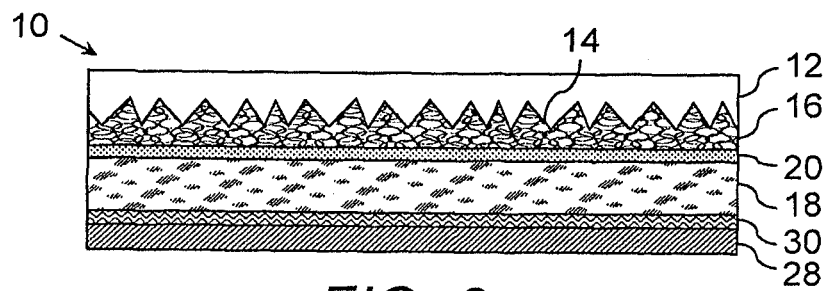
FIG. 3 is a cross-sectional view of a holographic structure containing a base material layer 18 affixed with laminating adhesive layer 20 and a liner 28 affixed with pressure-sensitive adhesive layer 30.

In particular embodiments, an antireflective or non-reflective coating or ink 22,24 is also applied to at least a portion of the image surface or lower surface of the micro-embossed holographic film layer 12 to dampen reflection from adjacent reflective coating 16 (see FIGS. 1C, 1D, 2C and 2D). The type of non-reflective coating employed will be dependent upon the effect to be achieved. For example, when a non-reflective clear transparent coating 22, in this case a primer, is applied to selectively fill in at least a portion of the lower surface of the micro-embossed holographic film layer 12 and a reflective ink 16 is then printed on areas which have the primer 22 and areas which lack the primer, the result is a metallic surface having two distinctive appearances, a shiny metallized appearance next to shiny metallized holographic image (FIGS. 1C and 2C). A similar effect is accomplished by printing a non-reflective ink 24, e.g., black, white, buff, etc. in selective areas of the micro-embossed structure without yielding a holographic appearance, while reflective inks 16 such as, e.g., metallic gold, silver etc. provide an adjacent holographic appearance (FIG. 1D or 2D).

Figure 4:
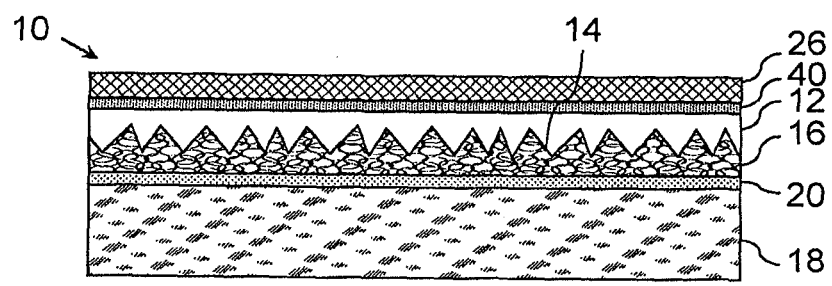
FIG. 4 is a cross-sectional view of a holographic structure containing a base material layer 18 and a micro-embossed holographic film layer 12 affixed to clear film 26 by laminating adhesive layer 40.
Figure 5:
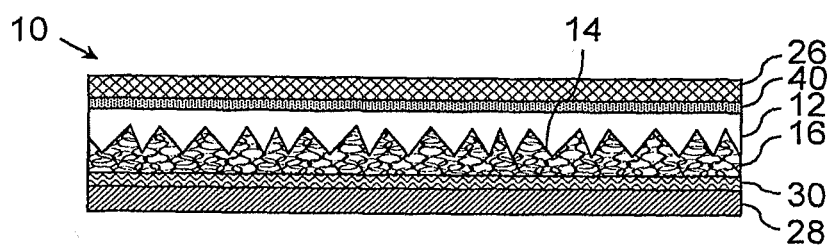
FIG. 5 is a cross-sectional view of a holographic structure containing a liner material layer 28 and a micro-embossed holographic film layer 12 affixed to clear film 26 by laminating adhesive layer 40.
Figure 6:
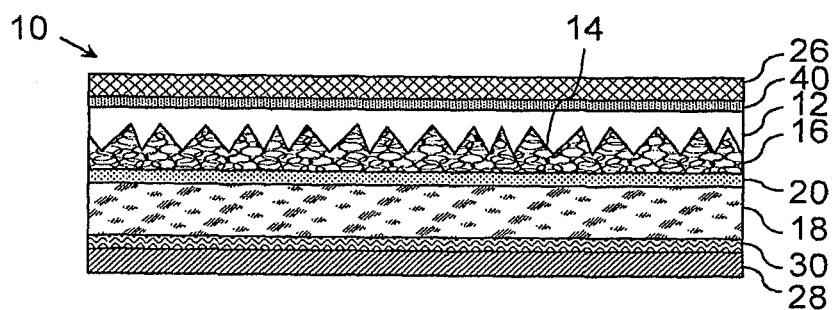
FIG. 6 is a cross-sectional view of a holographic structure containing a liner 28, base material layer 18, and a micro-embossed holographic film layer 12 affixed to clear film 26 by laminating adhesive layer 40.

As will be appreciated by one of skill in the art, the various embodiments of holographic structure 10 can be used in combination. For example, while certain embodiments embrace holographic structure 10 containing a base material 18 and liner material 26 (FIG. 3) other embodiments embrace a holographic structure 10 containing a clear film layer 26 used in combination with a base material layer 18 (FIG. 4), a clear film layer 26 used in combination with a liner material layer 28 (FIG. 5), and a clear film layer 26 used in combination with a base material layer 18 and liner material layer 28 (FIG. 6).

The holographic structure of the present invention can be supplied on rolls, sheets or die-cut for use on a variety of articles of manufacture for security, authenticity, or aesthetic appeal. For example, holographic labels are used on compact discs, computer software, cosmetics, watches, and sporting goods. Other uses include clothing hang tags, automobile-registration certificates, fine-jewelry certificates, concert and sporting-event tickets, recreational passes, credit cards, passports, driver licenses, postage stamps, government bonds and certificates, and so forth.

What is claimed is:

1. A holographic label for a container comprising:
    a micro-embossed holographic film layer with a holographic image on at least a portion of a lower surface thereof;
    a clear film layer affixed on at least a portion of an upper surface of the micro-embossed holographic film layer;
    a reflective coating printed on at least a portion of the lower surface of the micro-embossed holographic film layer;
    a base material layer adhered to the lower surface of the micro-embossed holographic film layer by a first adhesive layer;
    a second adhesive layer on a lower surface of the base material layer to adhere the label to a container; and
    a non-reflective coating printed on at least a portion of the lower surface of the micro-embossed holographic film layer to dampen reflection from the reflective coating, wherein the non-reflective coating comprises a non-reflective transparent primer.

2. The holographic label of claim 1, wherein the first and second adhesive layers comprise a pressure-sensitive adhesive layer.

3. The holographic label of claim 1, further comprising a removable liner material layer adhered to the lower surface of the base material layer by the second adhesive layer.

4. The holographic label of claim 1, wherein the reflective coating is printed on the entire lower surface of the micro-embossed holographic film layer that have or lack the non-reflective coating.

5. The holographic label of claim 1, wherein the reflective coating comprises a metallic ink.

6. The holographic label of claim 1, wherein the non-reflective coating comprises a non-reflective ink.

7. The holographic label of claim 1, wherein the container comprises a tube.

8. A holographic label for a container comprising:
    a micro-embossed holographic film layer with a holographic image on at least a portion of a lower surface thereof;
    a reflective coating printed on at least a portion of the lower surface of the micro-embossed holographic film layer;
    a non-reflective transparent primer printed on at least a portion of the lower surface of the micro-embossed holographic film layer to dampen reflection from the reflective coating;
    a base material layer adhered to the lower surface of the micro-embossed holographic film layer by a first adhesive layer; and
    a second adhesive layer on a lower surface of the base layer to adhere the label to a container.

9. The holographic label of claim 8, wherein the first and second adhesive layers comprise a pressure-sensitive adhesive layer.

10. The holographic label of claim 8, further comprising a removable liner material layer adhered to the lower surface of the base material layer by the second adhesive layer.

11. The holographic label of claim 8, wherein the reflective coating is printed on the entire lower surface of the micro-embossed holographic film layer that have or lack the non-reflective transparent primer.

12. The holographic label of claim 8, wherein the reflective coating comprises a metallic ink.

13. The holographic label of claim 8, further comprising a clear film layer affixed on at least a portion of an upper surface of the micro-embossed holographic film layer.

14. The holographic label of claim 8, wherein the container comprises a tube.

* * * * *

UNITED STATES PATENT AND TRADEMARK OFFICE
CERTIFICATE OF CORRECTION

PATENT NO.         : 8,817,347 B2                                        Page 1 of 1
APPLICATION NO.    : 14/016981
DATED              : August 26, 2014
INVENTOR(S)        : Weyermann et al.

It is certified that error appears in the above-identified patent and that said Letters Patent is hereby corrected as shown below:

In The Specification

In Column 2, line 63, reference numeral --16-- should be inserted after word "coating";

In Column 3, line 24, reference numeral --16-- should be inserted after word "coating";

In Column 3, line 26, reference numeral --24-- should be inserted after word "coating"; and In Column 4, line 29, reference numeral --14-- should be inserted after word "image.".

Signed and Sealed this
Twenty-seventh Day of January, 2015

Michelle K. Lee
*Deputy Director of the United States Patent and Trademark Office*